United States Patent
Cunningham (10) Patent No.: US 6,856,113 B1
(45) Date of Patent: Feb. 15, 2005

(54) CENTRAL VACUUM CLEANING SYSTEM MOTOR CONTROL CIRCUIT MOUNTING POST, MOUNTING CONFIGURATION, AND MOUNTING METHODS

(75) Inventor: J. Vem Cunningham, Aurora (CA)

(73) Assignee: Cube Investments Limited, Aurora (CA)

( * ) Notice: Subject to any disclaimer, the term of this patent is extended or adjusted under 35 U.S.C. 154(b) by 0 days.

(21) Appl. No.: 10/843,321

(22) Filed: May 12, 2004

(51) Int. Cl.[7] .......................... H01R 33/00; H02P 1/00
(52) U.S. Cl. ................... 318/491; 318/538; 310/85; 310/71; 439/490; 439/488; 439/620; 15/314; 15/319; 15/339
(58) Field of Search ............................. 318/255, 538, 318/491; 310/71, 85; 439/490, 488, 620; 15/314, 319, 339

(56) References Cited

U.S. PATENT DOCUMENTS

| | | | | |
|---|---|---|---|---|
| 4,531,796 A | * | 7/1985 | Gansert et al. ............. 439/589 |
| 5,244,409 A | * | 9/1993 | Guss et al. ................. 439/490 |
| D342,054 S | * | 12/1993 | Woodman .................. D13/146 |
| 5,274,878 A | * | 1/1994 | Radabaugh et al. .......... 15/314 |
| 5,343,590 A | * | 9/1994 | Radabaugh ................. 15/319 |
| 5,349,146 A | * | 9/1994 | Radabaugh ................. 200/61.6 |
| 5,409,398 A | * | 4/1995 | Chadbourne et al. ........ 439/490 |
| 5,448,827 A | * | 9/1995 | Ward ........................... 29/876 |
| 5,554,049 A | * | 9/1996 | Reynolds ................... 439/490 |
| 5,578,795 A | * | 11/1996 | Ward ............................ 174/53 |
| 5,740,581 A | * | 4/1998 | Harrelson, II ................ 15/314 |
| 5,740,582 A | * | 4/1998 | Harrelson, II ................ 15/315 |
| 5,924,164 A | * | 7/1999 | Lindsay, Jr. ................. 15/314 |
| 5,926,908 A | * | 7/1999 | Lindsay, Jr. ................. 15/319 |
| 6,336,825 B1 | * | 1/2002 | Seefried ..................... 439/488 |
| 6,425,293 B1 | * | 7/2002 | Woodroffe et al. ........... 73/756 |
| 6,546,814 B1 | * | 4/2003 | Choe et al. .............. 73/862.08 |
| 6,690,804 B2 | * | 2/2004 | Everett ........................ 381/91 |
| 2002/0001190 A1 | * | 1/2002 | Everett ........................ 362/86 |
| 2002/0127916 A1 | * | 9/2002 | Zhang ........................ 439/607 |
| 2004/0172782 A1 | * | 9/2004 | Smith et al. .................. 15/314 |
| 2004/0177468 A1 | * | 9/2004 | Smith et al. .................. 15/314 |

* cited by examiner

Primary Examiner—Paul Ip
(74) Attorney, Agent, or Firm—Dowell & Dowell, P.C.

(57) ABSTRACT

A central vacuum cleaning system has a motor in a motor housing in a canister with a receptacle. In the motor housing is a motor control circuit with a printed circuit board. The motor control circuit is mounted to the motor housing using a mounting post having a light guide. The mounting post receives light from a light source on the printed circuit board and guides the light through the mounting post to outside the motor housing. The mounting post can guide the light through structural or non-structural elements. The light provides illuminated information messages to a user. The mounting post has a low voltage connection section for receiving low voltage conductors from outside the motor housing. As the motor control circuit is within the motor housing, the motor housing is a motor control housing. The motor control housing can be separate from the motor housing.

12 Claims, 6 Drawing Sheets

CENTRAL VACUUM CLEANING SYSTEM MOTOR CONTROL CIRCUIT MOUNTING POST, MOUNTING CONFIGURATION, AND MOUNTING METHODS

FIELD OF THE INVENTION

The invention relates to motor control circuit mountings. More particularly, it relates to mountings used in association with illuminated information indicators.

BACKGROUND OF THE INVENTION

Many modern buildings have central vacuum cleaning systems. These systems have a suction motor to create a vacuum in a series of pipes through the building. A user of the system connects a flexible hose to one of the pipes. The hose has a handle for the operator to grasp. The handle is further connected to one or more cleaning accessories.

The motor is housed in a motor housing that typically forms part of a canister. The canister also has a receptacle portion for receiving dust and other particles picked up through the cleaning accessories and transported by the vacuum through the hose and pipes.

The canister is usually placed in a central location that is easily accessible for emptying the receptacle. The motor is typically powered by line voltage that is controlled by a motor control circuit in the motor housing.

Low voltage wires typically run beside, or form part of, the pipes and hose between the canister and the handle. This permits the operator to control the motor by sending low voltage signals from the handle to the motor control circuit. In order to receive the low voltage signals, an opening is provided in the motor housing through which the low voltage wires can be connected to the motor control circuit.

Initially, the motor control circuit was mounted outside the motor housing and the low voltage wires were fed into the motor housing through the opening. In some systems, a low voltage connector was provided at the opening, the low voltage wires from the building were connected to the connector on one side, and the connector was connected by further wires to the motor control circuit.

The inventor of the current invention created a mounting post that incorporates a low voltage connector and is rigidly connected to a circuit board of the motor control circuit. The mounting post holds the circuit board and its components from undesired contact with anything else in the motor housing, including the housing itself and the motor, and in generally fixed relationship with the motor housing. This simplifies the assembly of the motor control circuit in the motor housing.

When the mounting post is the only means of mounting the motor control circuit, the control circuit may be permitted to turn about the mounting post with respect to the motor housing. It is known to inhibit substantially all movement between the circuit board and the motor housing by securing the circuit board at a second position: namely, at the circuit breaker.

It is known to insert an LED with a square configuration in a cut-out in the mounting post; so that, the LED protrudes through the opening. The selection of readily available LEDs for the square configuration is limited in power and colour. The LED provides an illuminated information indicator of proper operation of the vacuum source.

SUMMARY OF THE INVENTION

In a first aspect the invention provides a mounting post for receiving light from a light source on a printed circuit board in a motor control circuit for use in a motor control housing of a central vacuum cleaning system. The mounting post has a first securing section for securing the mounting post to the motor control housing such that a portion of the mounting post is accessible from outside the motor control housing. It also has a light guide for guiding light from the light source through the mounting post for emission from the mounting post outside the motor control housing. It further has a second securing section for securing the mounting post to the printed circuit board such that the light guide receives light from the light source. It also has a stand-off section between the first securing section and the second securing section for holding the motor control circuit from undesired contact.

The mounting post may have a low voltage connection section for connection to one or more low voltage conductors. The low voltage connection section would form part of that portion of the mounting post that is accessible from outside the motor control housing. The mounting post may be clear. The mounting post may be made from polycarbonate resin. The mounting post may guide light through a structural element of the mounting post.

The mounting post may have an elongate body within which light is guided. The standoff section may have a shoulder at one end of the elongate body, the shoulder, at least in part, being wider than an opening in the motor housing to prevent the mounting post from fitting through the opening.

The first securing section may have a threaded portion extending from the shoulder, the threaded portion being smaller than the opening in the motor housing. It may also have the shoulder, and a nut compatible with threads of the threaded portion. The nut would be, at least in part, greater than the opening in the motor housing. The mounting post would be secured to the motor control housing by placing the threaded portion through the opening from inside the motor control housing and tightening the nut onto the threaded portion from outside the motor control housing.

In a second aspect, the invention provides a motor control circuit for use in a central vacuum cleaning system. The motor control circuit has a printed circuit board with a light source mounted to the printed circuit board, and the mounting post of the first aspect.

In a third aspect the invention provides a central vacuum cleaning system having a motor housing housing a motor. It also has a motor control circuit for controlling the motor, the motor control circuit having a printed circuit board with a light source mounted to the printed circuit board. It further has the mounting post of the first aspect.

In a fourth aspect the invention provides a central vacuum cleaning system canister. The canister has a motor housing housing a motor. It also has a motor control circuit for controlling the motor, the motor control circuit having a printed circuit board with a light source mounted to the printed circuit board. It further has the mounting post of the first aspect.

In a fifth aspect the invention provides a method of providing central vacuum cleaning system information messages from a motor control circuit of the central vacuum cleaning system to a user.

The method affixes a light source to a motor control circuit printed circuit board. It secures the mounting post of the first aspect to the printed circuit board over the light source. It illuminates the light source to provide a message to a user. It guides light from the light source through the mounting post to outside the motor control housing.

The details of the preferred embodiment of these and other aspects of the invention are set out further below.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DETAILED DESCRIPTION OF THE PREFERRED EMBODIMENT

Figure 1:
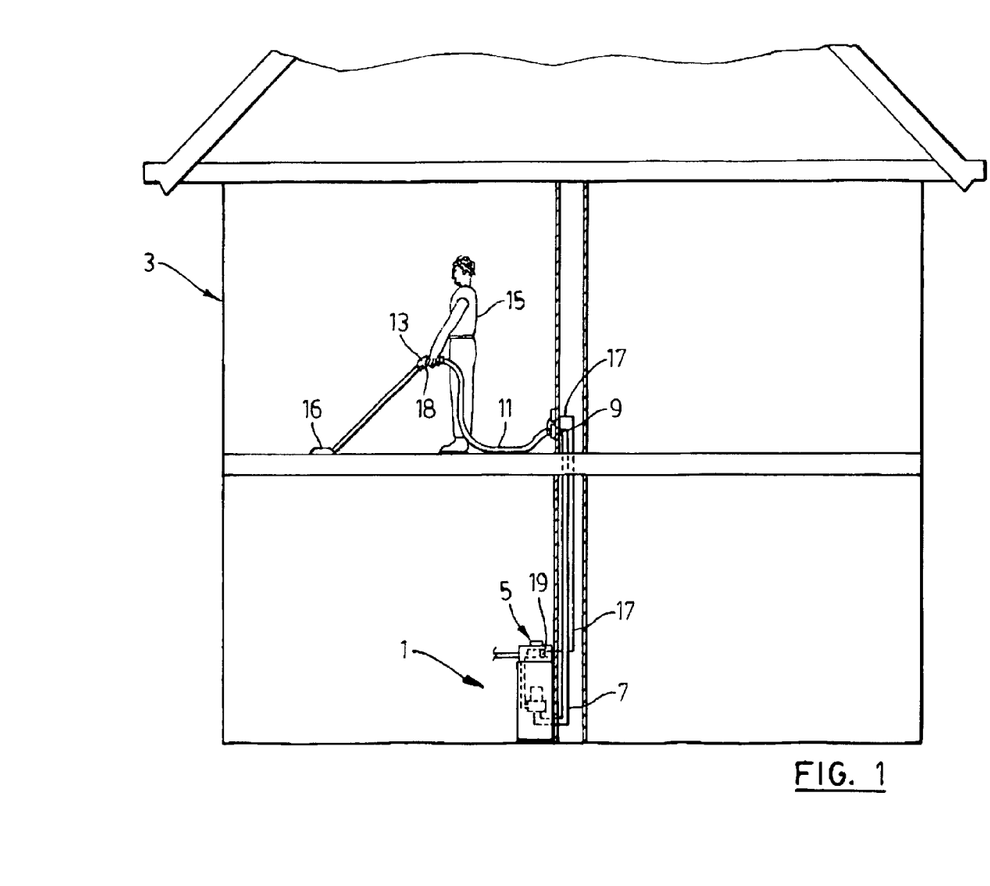
FIG. 1 is a cross-section of a building with a central vacuum cleaning system in accordance with the preferred embodiment of the present invention.

Referring to FIG. 1, a central vacuum cleaning system (indicated generally at 1) is installed in a building 3. The building 3 is shown as a residence; however, the system 1 could be installed in other buildings, such as commercial or industrial buildings.

The system 1 has a vacuum source 5 in a central location. The source 5 is connected through pipes 7 or other conduits in walls, floors or ceilings of the building 3. Alternatively, the pipes 7 may be exposed. The pipes 7 terminate at valves 9 to which a flexible hose 11 may be connected. The hose 11 terminates in a handle 13 that is held by an operator 15. Various cleaning attachments, such as a carpet brush 16, are connected to the handle 13.

Running beside, or as part of, the pipes 7 and the hose 11 is a pair of low voltage wires 17 that provide control signals, such as ON/OFF, from the operator 15 through a switch 18 in the handle 13. More sophisticated systems 1 may utilize the low voltage wires 17 for many other purposes, such as duplex communications that allow the receipt of information at the handle 13. Such information could be used to drive LEDs or other display means 19 for communication with the operator 15. When the operator 15 turns on the system 1, dirt is drawn by a vacuum created by the vacuum source 6 through the attachment 16, handle 13, hose 11, and pipes 7.

Figure 2:
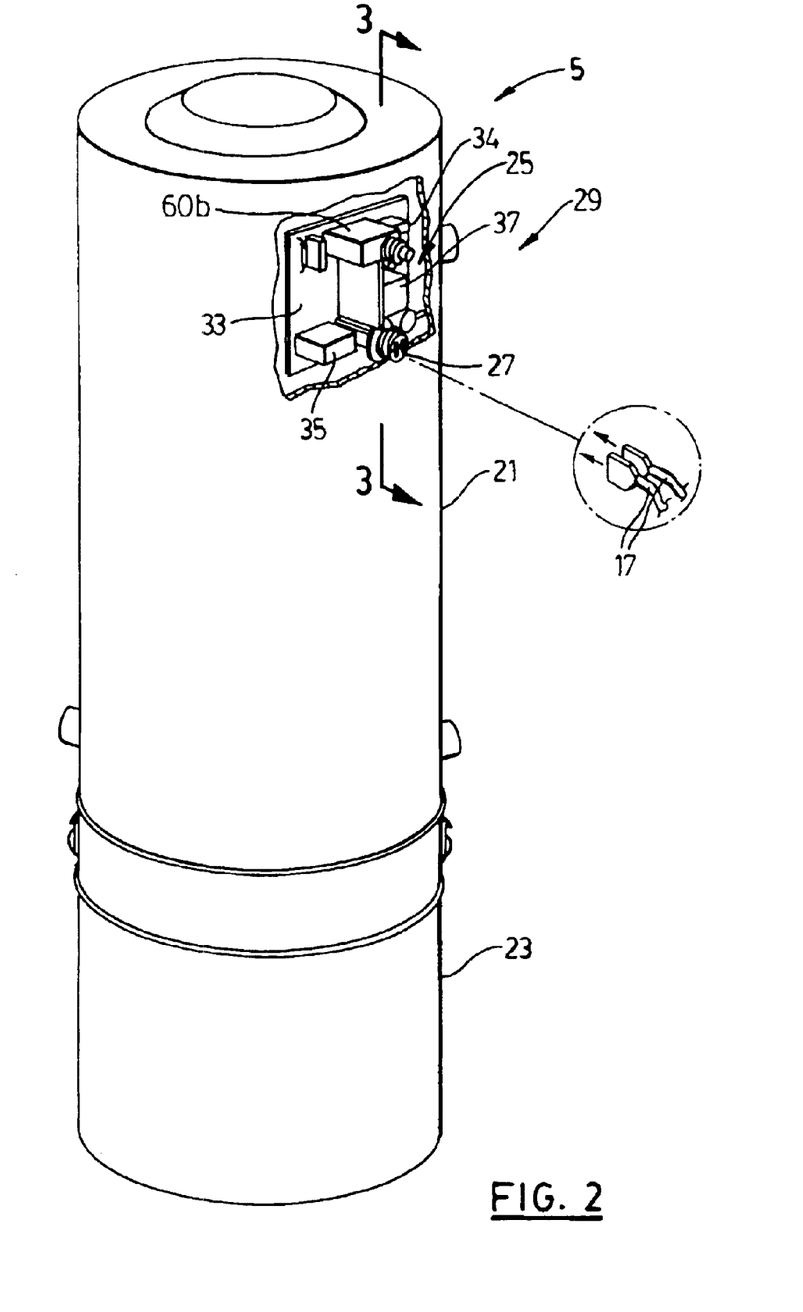
FIG. 2 is a cut-away perspective view of a canister used in the system of FIG. 1, showing a motor control circuit with a mounting post in accordance with the preferred embodiment of the present invention.

Referring to FIG. 2, the vacuum source 5 has a motor, not shown, within a motor housing 21. Extending from the motor housing 21 is, typically, a receptacle 23 for receiving the dirt. Also within the motor housing 21 is a motor control circuit 25. The motor control circuit 25 extends through the housing 21 and terminates in a low voltage connector 27. The connector 27 receives a corresponding connector 29 of the low voltage wires 17. In the preferred embodiment, the motor housing 21 also acts as a motor control housing 21. Accordingly, the motor housing 21 will be referred to as a motor control housing herein, unless the context requires otherwise. It is to be understood that the motor housing and motor control housing could be separate from one another.

It is to be noted that low voltage wires 17 may be replaced by wireless transmitters and receivers, not shown, at least one of which may be connected, directly or indirectly, to the connector 27 to provide the low voltage signals that would otherwise be provided through low voltage wires 17. Alternatively, a transmitter and/or receiver could be placed inside the motor control housing 21 as part of the motor control circuit 25.

Figure 3:
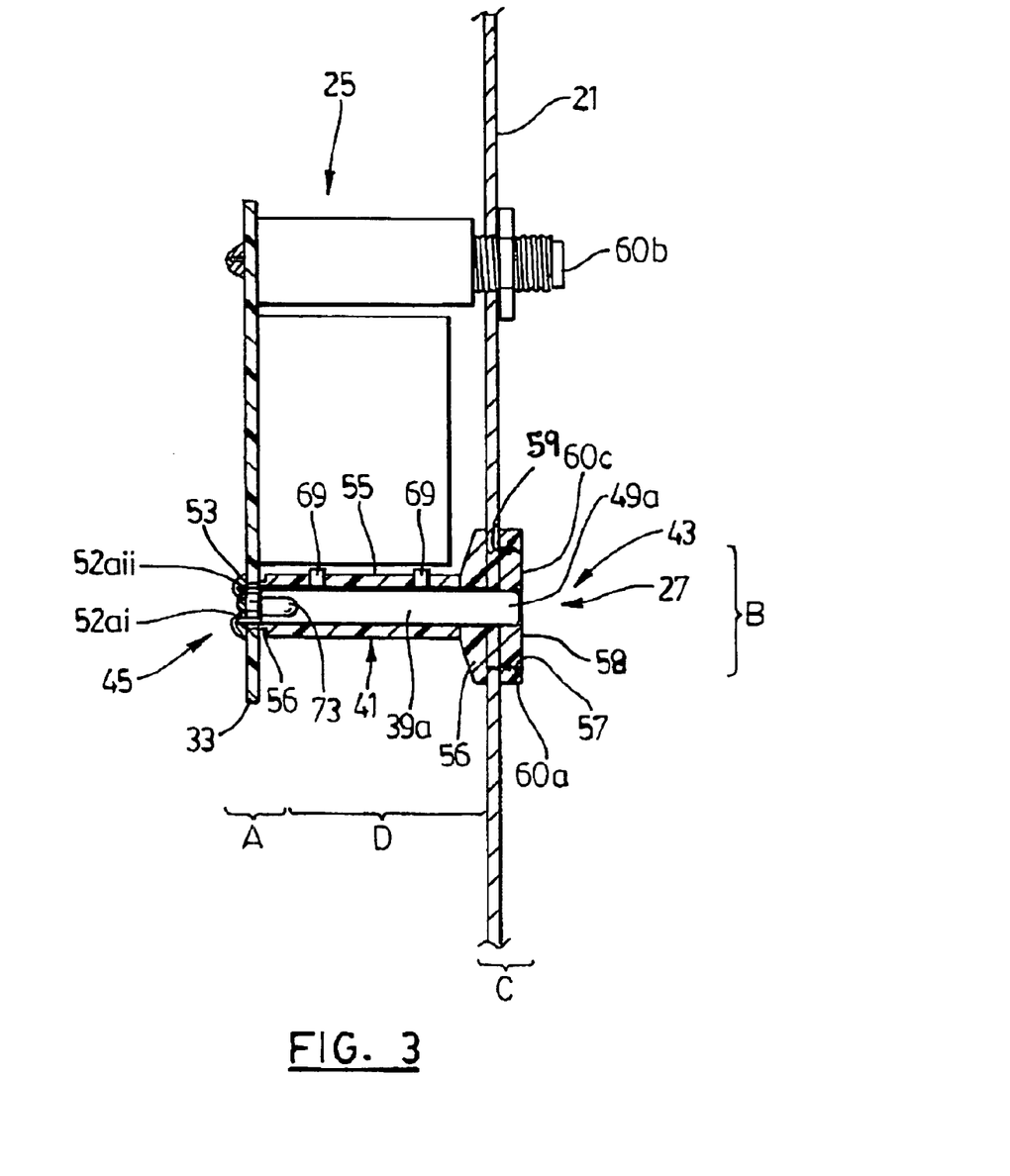
FIG. 3 is a cross-section of the motor control circuit, the mounting post and a portion of the canister of FIG. 2.
Figure 4:
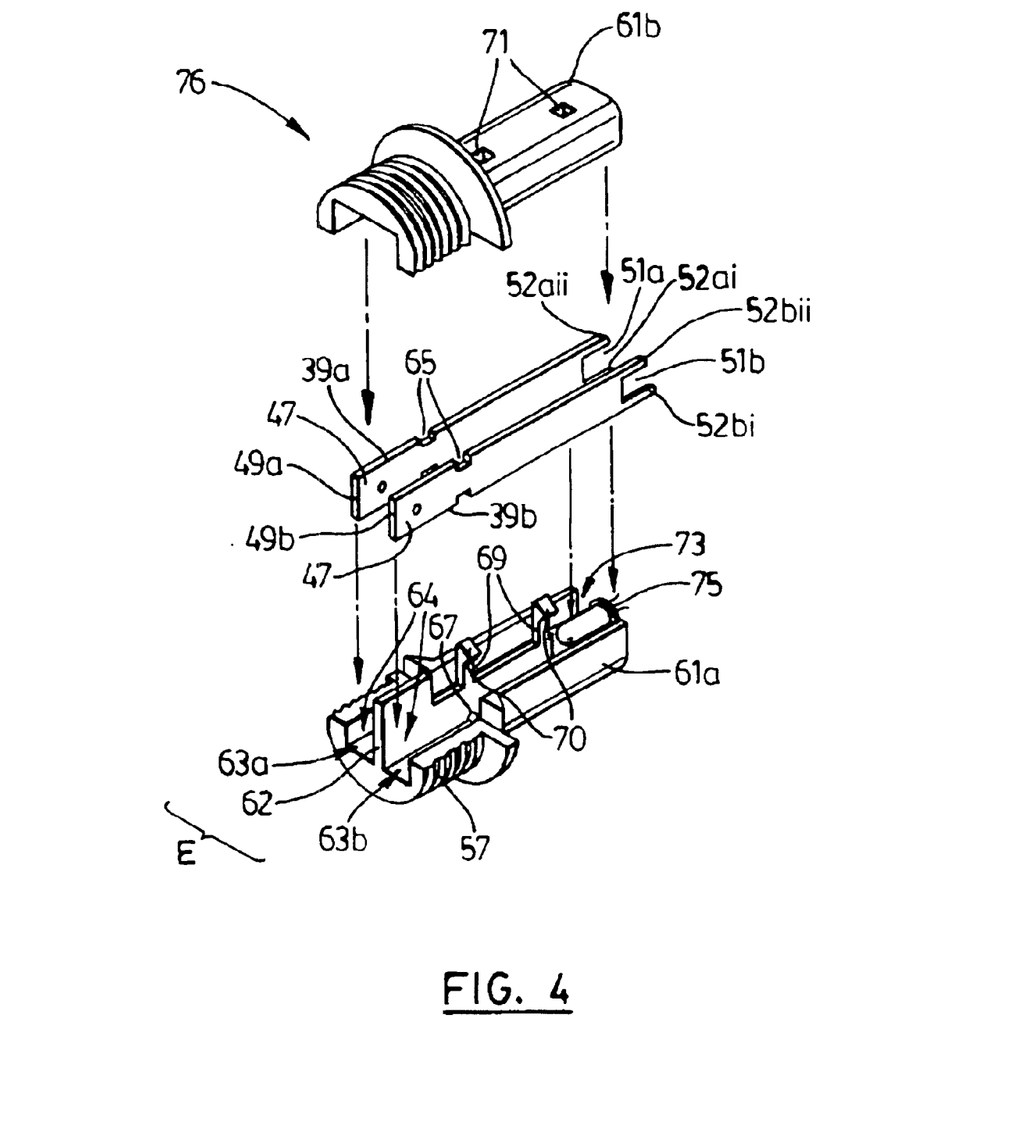
FIG. 4 is an exploded perspective view of the mounting post of FIG. 2.

Referring to FIGS. 2 through 4, the motor control circuit 25 is typically laid out on a printed circuit board 33 that has a microprocessor 34, relay 35 and a line to low voltage transformer 37. The switch 18 (FIG. 1 in the handle 13 is typically a momentary switch 18. When the switch 18 is actuated a control signal is sent to the microprocessor 34 that causes a change of state of the relay 35 to connect or disconnect power to the motor.

The connector 27 has conductors 39a, 39b for conducting electricity between the printed circuit board 33 and the low voltage wires 17. The conductors 39 are surrounded by a housing 41, except at opposing first and second housing ends 43, 45. The conductors 39 are solid conductors 39 that extend as a prong 47 at one end 49a, 49b for connection to a low voltage wire 17. At an opposing end 51a, 51b each conductor 39 terminates in pins 52ai, 52aii, 52bi, 52bii that extend beyond the second end 45 of the housing 41 for insertion into through holes 53 in the printed circuit board 33. The conductors 39 are soldered at the underside 54 of the printed circuit board 33. This secures the conductors 39 and, thus, the housing 41 to the board 33 and connects them to the motor control circuit 25. The housing 41, conductors 39, pins 52 provide a securing section A for physically securing the housing 41 to the printed circuit board 33.

The principles described herein are not limited to a securing section A using pins 52. For example, the housing 41 could have pins, not shown, extending from second housing end 45 for insertion through holes, not shown, in the printed circuit board 33. The pins would be of the same material as the housing 41. The housing 41 is then secured to the printed circuit board 33 by heat welding the pins.

As shown, the housing 41 is recessed about the end 49a, 49b to securely receive dual female-configured connector 29. The principles described herein are not limited to the configuration shown for the housing 41 and prongs 47. For example, it is not required that the housing 41 be recessed. The prongs 47 could extend beyond the housing 41. As another alternative, the prongs 47 could be replaced by a female-configured connector 27 for receipt of a male-configured connector 29. Also, the conductors 39 need not be flat plate conductors 39. For example, the prongs 47 could be connected to wires that extend the length of the housing 41 for insertion into through holes 53 or an alternative means for connection to the printed circuit board.

The connector 27 forms a low voltage connection section B for electrical connection of the low voltage wires 17 or other low voltage conductors to the motor control circuit 25.

The housing 41 has an elongate body 55 that terminates in a shoulder 56. The housing 41 has a cylindrical threaded portion 57 extending above the shoulder 56. The cylindrical threaded portion 57 terminates in a face 58 to permit access to the prongs 47. The connector 27 is recessed into the cylindrical threaded portion 57 through the face 58. The cylindrical threaded portion 57 is dimensioned to fit through a circular opening 59 in the motor housing 21 in order to receive a nut 60a.

The nut 60a is threaded onto the threaded portion 57. The nut 60a and shoulder 56 are dimensioned to be sufficiently greater than the diameter of the opening 59 to secure the motor control circuit 25 to the motor housing 21 when the nut 60a is tightened. The shoulder 56 and threads 57 form a securing section C for securing the motor control circuit 25 to the motor housing 21. Other components of the motor control circuit 25, such as circuit breaker 60b, may also perform the securing function to prevent rotation of the motor control circuit 25 with respect to the motor housing 21.

It is to be noted that the opening 59 need not be circular. In fact, a non-circular opening 59 might assist in preventing rotation of the motor control circuit 25, where a second securing point (such as circuit breaker 60b) is not used. The profile of the securing section C at the opening 59 could be changed to match the shape of the opening 59.

Preferably, the face 58 is flush with top surface 60c of nut 60a for aesthetic reasons. In the preferred embodiment, the face 58 is flat, except about the connectors 27. This is a design choice. The face 58 needs to be configured to allow access to the prongs 47 as discussed above (where a low voltage connection is used) and to be visible to the user where light is emitted from the face 58.

Again, the principles described herein are not limited to the particular form of securing section C described herein. The securing section C could take many forms. For example, the housing 41 could be secured to the motor housing 21 using a snap-in fitting.

The body 55 is sufficiently long to electrically isolate components on the circuit board 33 from the motor housing 21, to provide air circulation between the printed circuit board 33 and the motor housing 21, and to meet other regulatory, safety and design requirements.

The body 55 and shoulder 56 form a stand-off section D between the motor control circuit 25 and the motor control housing 21. Again, the principles described herein are not limited to a stand-off section D in the particular form shown in the Figs. For example, the shoulder 56 does not need to extend about the entire circumference of the housing 41.

For ease of manufacture and assembly, the housing 41 is made in two longitudinal pieces 61a, 61b. One piece 61a has a cross-member 62 that splits the body 55 into two longitudinal cavities 63a, 63b. The cavities 63 have respective opposing grooves 64. One conductor 39 fits into the groove 64 of each cavity 63. The conductors 39 have notches 65, and the housing pieces have corresponding bosses 67 for retaining the conductors 39 when the pieces 61 are combined to form the housing 41. A tab 69 with a hook 70 extends from the cross-member 62 for insertion into an opposing hole 71 in the piece 61b. The hole 71 is slightly offset from the tab 69. The tab 69 is sprung as it is inserted into the hole 71 and snaps back to engage the hook 70 on the exterior of the piece 61b. This secures the two pieces 61 together to form the housing 41.

The housing 41 has a hollow 73 into the body 55 for receiving a light source 75 on the printed circuit board 33. The light source 75 shown is an LED 75. The housing 41 is made from a translucent, preferably transparent, material that acts as a light guide E (FIG. 4) to guide light from the light source 75 through the housing 41 to the face 58.

Again, the principles described herein are not limited to the particular configuration of housing 41 illustrated in the FIGS. For example, the housing 41 could be made in a single piece moulded about conductors 39.

The securing section A, connection section B, securing section C, stand-off section D and light guide E form a mounting post 76. If a wireless transmitter and/or receiver is in the motor control housing 21 then there may be no need for the low voltage connection section B; however, the mounting post 76 will continue to be useful in order to guide light from the source 75 to the face 58 for the communication of information to a user.

Although the preferred embodiment is being described with reference to a motor control circuit 25 for mounting inside a motor housing 21, as mentioned previously, the circuit 25 need not be mounted inside the motor housing 21. For example, the circuit 25 could be mounted within a control box, not shown, outside the housing 21 with wires fed back into the housing 21 for operation of the motor. This might be done for additional isolation of the control circuit 25 from the motor. For example, it might be helpful to avoid electromagnetic interference from the motor. The control box would be an alternate form of motor control housing 21. As mentioned previously, for this reason, the motor housing 21 is being referred to as a motor control housing 21 in this description, unless the context requires otherwise.

Figure 6:
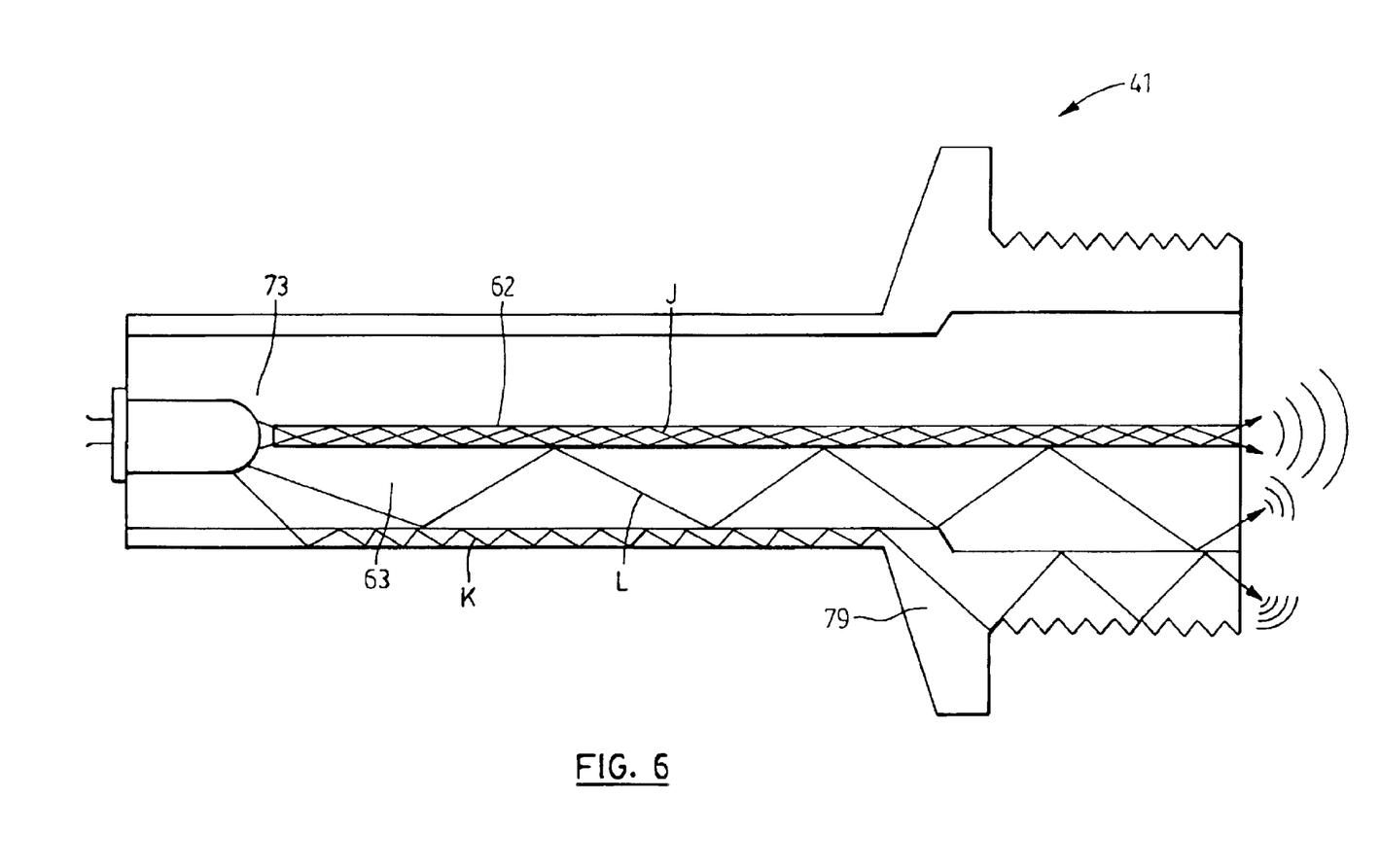
FIG. 6 is a perspective view of the mounting post of FIG. 2 showing possible light guided paths.

Referring to FIG. 6, light enters the cross-member 62 above the hollow 73 and is guided to the face 58 and exits through the face 58, as shown at arrows J. It is also possible that light can enter through the interior wall 79 of the cavities 63 and be guided through the interior wall 79 to the face, as shown at arrows K. Light may also be guided within the cavities 63 to the face 58, as shown by arrows L. Conductors 39 have been omitted from FIG. 6 for clarity. The conductors 39 may change the path L for some light, as light is reflected from the conductors 39.

How much light is captured by the various potential guide paths, how much light is lost in those paths (for example, by escaping as it meets an interface, or by absorption), and how much light is emitted at the face 58 will depend on the orientation of the light source and the paths, the material or materials of the light guide, and the intensity and wavelength of the light source 75, among other factors. Although preferred specifications for these factors are shown and/or described, others may be chosen depending on the particular circumstances of a given application.

In the preferred embodiment, very limited amounts of light are guided through paths K and L to be emitted at the face 58. As sufficient light is guided through path i, the other paths K and L were not optimized. For example, path K, could be shaped for orientation of a light entrance towards the light source 75 to better capture light.

In the preferred embodiment, a clear, uncoloured polycarbonate resin is used to create the housing 41 as it is rigid, long lasting and inexpensive, and has acceptable optical properties. Many alternative materials may be used to fulfil the principles described herein.

Thus, the mounting post 76 utilizes structural elements of the post 76, i.e. elements that are part of the structural integrity of the post 76, such as the cross-member 62 and wall 79. We will see later that other nor-structural elements of the post 76 may be used to guide the light.

As the housing 41 has a flexible design, it can be adapted to work with different light sources 75.

LEDs are a preferred choice as LEDs are long lasting, small, inexpensive, and low power devices. Higher power LEDs, LEDs of different colours, multi-colour LEDs, and LEDs of different shapes and sizes may all be used. Standard LED packages such as a T-1 or T-1¾ can be used. These tend to be the least expensive. This allows for LEDs of more than 3000 mcd, for example 3200 mcd and 4500 mcd in green. These are examples only and many other sizes and configurations can be used. For example, a multi-colour LED could be used to provide many possible signalling combinations, such as a red/yellow LED that can provide red solid, red flashing, yellow solid, yellow flashing, orange solid, and orange flashing. Also, single colour LEDs can be chosen from a wide variety of colours, including green, yellow, red, white and blue, among others.

The messages provided to the user by the LEDs might include, for example, 1) informing the user that electrical power is present and the system 1 has no apparent problems, 2) the dust receptacle 23 is full and should be emptied, 3) service to the system 1 is needed, 4) service to the motor is required, i.e. change the brushes, 6) the system 1 is not functioning properly, there is some type of blockage in the pipes 7, in the flexible hose 11 or the filter medium is clogged. These are samples of the types of messages that might be conveyed to the user. Many other messages could be conveyed as desired by the designers of the motor control circuit 25.

Figure 7:
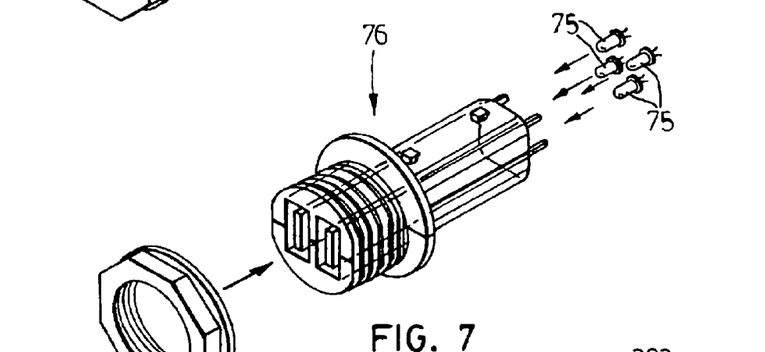
FIG. 7 is an exploded perspective view of the mounting post of FIG. 2 and multiple light sources.

Referring to FIG. 7, an alternative mounting post 101 has a hollow 103 sufficient to cover multiple LED light sources 105a, 105b, 105c. This allows for multiple colours, while using inexpensive single colour LEDs 105. The particular shape of the housing 41 will be a design choice to allow sufficient light to be captured from each of the LEDs 105 for guiding to the face 58. For example, in many cases it will be sufficient to simply have a clear housing 41 placed over and in sufficient proximity to the light source 75 to guide incident light to the face 58. Although non incident light from the light source 75 is wasted, extra light inside the motor housing 21 will generally have no detrimental result.

Figure 8:
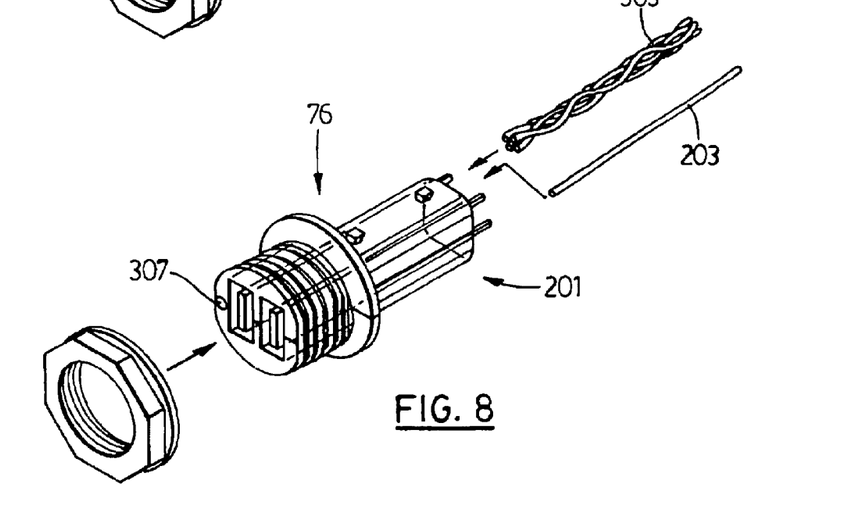
FIG. 8 is an exploded perspective view of an alternative mounting post and nut utilizing an optical fibre and, alternatively, a plurality of optical fibres.

Referring to FIG. 8, an alternate mounting post 201 utilizes an optical fibre 203 to guide light from a light source, not shown. An alternative mounting post 201 could utilize braided optical fibre 303 to guide light from the light source. In the post 201, the fibres 203, 303 are non-structural elements that are used to guide the light.

Figure 5:
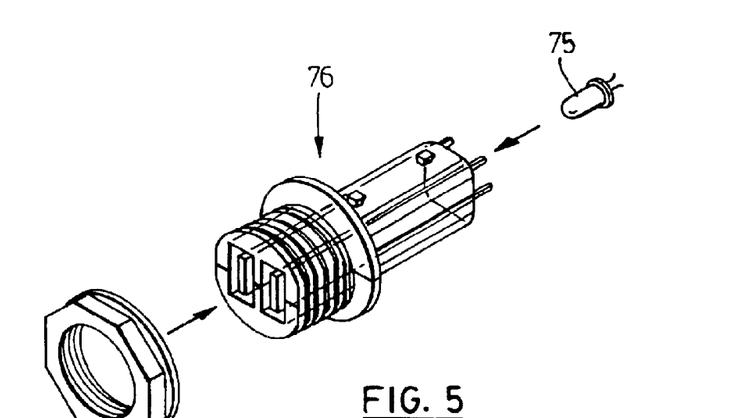
FIG. 5 is an exploded perspective view of the mounting post and light source of FIG. 2, including a retaining nut.

The embodiments shown in FIGS. 5 and 7 could utilize a housing 41 that is non-translucent except to allow light to be guided through the face 58. In this case the face 58 may be translucent, or the fibres 203, 303 could extend through and flush with the face 58 at aperture 307. As a further alternative, an opening, such as aperture 307, could allow light guided inside the mounting post 76 to exit the aperture 307 and be viewed by a user. The aperture 307 could be enclosed by a translucent cover, not shown, or left unenclosed.

Similarly, a housing 41 could have one or more portions (for example, only the cross-member 62) that are translucent to permit light to be guided from a light source on the printed circuit board 33 to the face 58 through the translucent sections of the housing 41.

It will be understood by those skilled in the art that this description is made with reference to the preferred embodiment and that it is possible to make other embodiments employing the principles of the invention which fall within its spirit and scope as defined by the following claims.

I claim:

1. A mounting post for receiving light from a light source on a printed circuit board in a motor control circuit for use in a motor control housing of a central vacuum cleaning system, the mounting post comprising:
    a) a first securing section for securing the mounting post to the motor control housing such that a portion of the mounting post is accessible from outside the motor control housing,
    b) a second securing section for securing the mounting post to the printed circuit board such that the light guide receives light from the light source,
    c) a stand-off section between the first securing section and the second securing section for holding the motor control circuit from undesired contact and
    d) a light guide for guiding light from the light source through the mounting post for emission from the mounting post outside the motor control housing.

2. The mounting post of claim 1, further comprising:
    e) a low voltage connection section for connection to one or more low voltage conductors, the low voltage connection section forming part of that portion of the mounting post that is accessible from outside the motor control housing.

3. The mounting post of claim 1, wherein the mounting post is clear.

4. The mounting post of claim 1, wherein the mounting post is made from polycarbonate resin.

5. The mounting post of claim 1, wherein light is guided through a structural element of the mounting post.

6. The mounting post of claim 1, wherein the standoff section comprises an elongate body within which light is guided.

7. The mounting post of claim 6, wherein the standoff section further comprises a shoulder at one end of the elongate body, the shoulder, at least in part, wider than an opening in the motor housing to prevent the mounting post from fitting through the opening.

8. The mounting post of claim 7, wherein the first securing section comprises:
    a) a threaded portion extending from the shoulder, the threaded portion being smaller than the opening in the motor housing;
    b) the shoulder,
    c) a nut compatible with threads of the threaded portion, and being, at least in part, greater than the opening in the motor housing,
    wherein, the mounting post is secured to the motor control housing by placing the threaded portion through the opening from inside the motor control housing and tightening the nut onto the threaded portion from outside the motor control housing.

9. A motor control circuit for use in a central vacuum cleaning system, the motor control circuit comprising:
    a) a printed circuit board with a light source mounted to the printed circuit board,
    b) and a mounting post as set out in claim 1.

10. A central vacuum cleaning system comprising:
    a) a motor housing housing a motor;
    b) a motor control circuit for controlling the motor, the motor control circuit having a printed circuit board with a light source mounted to the printed circuit board,
    c) and a mounting post as set out in claim 1.

11. A central vacuum cleaning system canister, comprising;
    a) a motor housing housing a motor;
    b) a motor control circuit for controlling the motor, the motor control circuit having a printed circuit board with a light source mounted to the printed circuit board,
    c) and a mounting post as set out in claim 1.

12. A method of providing central vacuum cleaning system information messages from a motor control circuit of the central vacuum cleaning system to a user, the method comprising:
    a) Affixing a light source to a motor control circuit printed circuit board,
    b) Securing a mounting post to the printed circuit board over the light source, wherein the mounting post is as set out in claim 1,
    c) Illuminating the light source to indicate a message to be sent to the user,
    d) Guiding light from the light source through the mounting post to outside the motor control housing.

\* \* \* \* \*